United States Patent
Cheng et al.

(10) Patent No.: US 12,499,264 B2
(45) Date of Patent: Dec. 16, 2025

(54) DATABASE ACCESS METHOD AND APPARATUS

(71) Applicant: HUAWEI TECHNOLOGIES CO., LTD., Guangdong (CN)

(72) Inventors: Kun Cheng, Beijing (CN); Liang Guo, Shenzhen (CN); Jinwei Zhu, Novosibirsk (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 150 days.

(21) Appl. No.: 18/478,977

(22) Filed: Sep. 29, 2023

(65) Prior Publication Data
US 2024/0028759 A1 Jan. 25, 2024

Related U.S. Application Data

(63) Continuation of application No. PCT/CN2022/082450, filed on Mar. 23, 2022.

(30) Foreign Application Priority Data

Mar. 29, 2021 (CN) .......................... 202110335806.6

(51) Int. Cl.
*G06F 21/00* (2013.01)
*G06F 21/31* (2013.01)
(Continued)

(52) U.S. Cl.
CPC .......... *G06F 21/6227* (2013.01); *G06F 21/31* (2013.01); *G06F 21/602* (2013.01)

(58) Field of Classification Search
None
See application file for complete search history.

(56) References Cited

U.S. PATENT DOCUMENTS

| 2013/0305392 A1* | 11/2013 | Bar-El | H04L 9/3226 726/29 |
| 2019/0268308 A1 | 8/2019 | Sinha et al. | |
| 2022/0414223 A1* | 12/2022 | Liu | G06N 3/02 |

FOREIGN PATENT DOCUMENTS

CN 105812428 B * 9/2019

OTHER PUBLICATIONS

Wang Yongzhi et al: "CryptSQLite: Protecting Data Confidentiality of SQLite with Intel SGX", 2017 International Conference on Networking and Networkapplications (NANA), Oct. 1, 2017 (Oct. 1, 2017), pp. 303-308, XP093146618.

(Continued)

*Primary Examiner* — Andrew J Steinle

(57) ABSTRACT

A database access method and apparatus are disclosed, to ensure data security during interaction between a user and a database, and effectively reduce performance overheads. The method includes: receiving an encrypted data computation request sent by a database kernel, where the encrypted data computation request requests to perform computation on encrypted data of a user, and the database kernel runs in a non-secure execution environment; receiving encrypted data sent by the database kernel, where the encrypted data is all encrypted data in a user query request; performing decryption and computation on the encrypted data in response to the encrypted data computation request, to obtain a computation result; encrypting the computation result to obtain an encrypted computation result; and sending the encrypted computation result to the database kernel.

20 Claims, 8 Drawing Sheets

---

S301: Receive an encrypted data computation request sent by a database kernel, where the encrypted data computation request requests to perform computation on encrypted data of a user, and the database kernel runs in a non-secure execution environment S302: Receive encrypted data sent by the database kernel, where the encrypted data is all encrypted data in a user query request S303: Perform decryption and computation on the encrypted data in response to the encrypted data computation request, to obtain a computation result S304: Encrypt the computation result to obtain an encrypted computation result S305: Send the encrypted computation result to the database kernel

(51) Int. Cl.
G06F 21/60 (2013.01)
G06F 21/62 (2013.01)

(56) References Cited

OTHER PUBLICATIONS

Vinayagamurthy, D., Gribov, A., and Gorbunov, S. (2019). StealthDB: a Scalable Encrypted Database with Full SQL Query Support, Proceedings on Privacy Enhancing Technologies, 2019(3), 370-388. doi: https://doi.org/10.2478/popets-2019-0052.
C. Priebe, K. Vaswani and M. Costa, "EnclaveDB: A Secure Database Using SGX," 2018 IEEE Symposium on Security and Privacy (SP), San Francisco, CA, 2018, pp. 264-278, doi: 10.1109/SP.2018.00025.
S. Ribeiro, P.; Santos, N. and O. Duarte, N. (2018). DBStore: A TrustZone-backed Database Management System for Mobile Applications. In Proceedings of the 15th International Joint Conference on e-Business and Telecommunications—vol. 2 Secrypt: Secrypt, ISBN 978-989-758-319-3, ISSN 2184-2825, pp. 396-403. DOI: 10.5220/0006883605620569.

* cited by examiner

S301: Receive an encrypted data computation request sent by a database kernel, where the encrypted data computation request requests to perform computation on encrypted data of a user, and the database kernel runs in a non-secure execution environment S302: Receive encrypted data sent by the database kernel, where the encrypted data is all encrypted data in a user query request S303: Perform decryption and computation on the encrypted data in response to the encrypted data computation request, to obtain a computation result S304: Encrypt the computation result to obtain an encrypted computation result S305: Send the encrypted computation result to the database kernel

FIG. 3

DATABASE ACCESS METHOD AND APPARATUS

CROSS-REFERENCE TO RELATED APPLICATIONS

This application is a continuation of International Application No. PCT/CN2022/082450, filed on Mar. 23, 2022, which claims priority to Chinese Patent Application No. 202110335806.6, filed on Mar. 29, 2021. The disclosures of the aforementioned applications are hereby incorporated by reference in their entireties.

TECHNICAL FIELD

This application relates to the field of data processing technologies, and more specifically, to a database access method and apparatus.

BACKGROUND

Security protection for a database that serves as one of important basic software has become a challenge that urgently needs to be addressed. In terms of a challenge for protecting sensitive data, to prevent an unauthorized program or a malicious administrator from tampering with or stealing sensitive data of a user, data is usually encrypted in the industry, and sensitive data is stored in ciphertext. However, when the user performs an operation on the sensitive data (for example, querying), the ciphertext still needs to be decrypted on a corresponding computing platform. Therefore, at an operation moment, data still exists in a memory of the computing platform in a plaintext form, and the plaintext data is a great security risk. In addition, in a technical solution in which an operation is performed on ciphertext according to a cryptographic algorithm, only some operations (such as equality querying and sorting) can be performed, and execution performance is usually poor. Therefore, a method for ensuring security of sensitive data of the user during interaction between the user and a database is urgently needed.

SUMMARY

This application provides a database access method and apparatus, to ensure data security during interaction between a user and a database, and effectively reduce performance overhead.

According to a first aspect, a database access method is provided. The method is performed in a trusted execution environment, and includes: receiving an encrypted data computation request sent by a database kernel, where the encrypted data computation request requests to perform computation on encrypted data of a user, and the database kernel runs in a non-secure execution environment; receiving encrypted data sent by the database kernel, where the encrypted data is all encrypted data in a user query request; performing decryption and computation on the encrypted data in response to the encrypted data computation request, to obtain a computation result; encrypting the computation result to obtain an encrypted computation result; and sending the encrypted computation result to the database kernel.

In the database access method in this embodiment of this application, the encrypted data is sent to a module in the trusted execution environment, to avoid frequent switching between the trusted execution environment and the non-secure execution environment during data requesting and data transmission, and reduce performance overheads. The encrypted data is sent to the module in the trusted execution environment before computation is performed on the encrypted data. In this way, data in the non-secure execution environment does not need to be requested again during computation for the encryption data. This avoids leakage of a data access mode during execution, and achieves higher security.

With reference to the first aspect, in some implementations of the first aspect, the receiving encrypted data sent by the database kernel includes: receiving a data eigenvalue sent by the database kernel, where the data eigenvalue indicates the encrypted data; sending a first feedback to the database kernel when the data eigenvalue is not found in a cache record; and receiving the encrypted data sent by the database kernel in response to the first feedback.

With reference to the first aspect, in some implementations of the first aspect, the method further includes: decrypting the encrypted data to obtain plaintext data; labeling the plaintext data by using the data eigenvalue and storing the plaintext data; and adding the data eigenvalue to the cache record.

With reference to the first aspect, in some implementations of the first aspect, the receiving encrypted data sent by the database kernel includes: receiving a data eigenvalue sent by the database kernel, where the data eigenvalue indicates the encrypted data; sending a second feedback to the database kernel when the data eigenvalue is found in a cache record; and obtaining, from stored plaintext data based on the data eigenvalue, plaintext data corresponding to the data eigenvalue, where the plaintext data is data obtained by decrypting the encrypted data.

In the database access method in this embodiment of this application, the encrypted data is decrypted and then cached in the TEE. When computation needs to be performed on the encrypted data again within a period of time, the encrypted data does not need to be transmitted or decrypted again. This further reduces performance overheads.

With reference to the first aspect, in some implementations of the first aspect, the method further includes: receiving an identity authentication request forwarded by the database kernel, where the identity authentication request is initiated by a database client, and the database client runs in a non-secure execution environment; sending identity authentication information to the database kernel; and receiving the encrypted data computation request sent by the database kernel, where the encrypted data computation request is sent after authentication based on the identity authentication information succeeds.

In the database access method in this embodiment of this application, before data is transmitted, validity of the trusted execution environment is verified, to prevent an unauthorized program or an attacker from stealing user data by forging the trusted execution environment, and to ensure security of the user data.

With reference to the first aspect, in some implementations of the first aspect, the method further includes: receiving a data key of the user that is forwarded by the database kernel, where the data key is encrypted by using an ECDH algorithm; generating a verification key, an encryption/decryption key, and an initial vector value based on the data key; receiving the encrypted data sent by the database kernel; and checking integrity of each piece of data of the encrypted data based on the verification key.

With reference to the first aspect, in some implementations of the first aspect, the encrypted data is data on which an integrity check succeeds.

With reference to the first aspect, in some implementations of the first aspect, the performing decryption and computation on the encrypted data according to the encrypted data computation request includes: decrypting each piece of data of the encrypted data based on the encryption/decryption key and the initial vector value, to obtain plaintext data corresponding to each piece of data; and calling, according to the encrypted data computation request, an operator to perform computation on the plaintext data corresponding to each piece of data.

With reference to the first aspect, in some implementations of the first aspect, the encrypting the computation result includes: encrypting the computation result based on the encryption/decryption key and the initial vector value.

In the database access method in this embodiment of this application, a key derived from the data key of the user is used to encrypt and decrypt data, to further ensure security of user data.

With reference to the first aspect, in some implementations of the first aspect, the method further includes: setting a timer; and clearing the encrypted data, the verification key, the encryption/decryption key, and the initial vector value based on that the timer exceeds first preset time or an exit request initiated by the database client and forwarded by the database kernel is received.

With reference to the first aspect, in some implementations of the first aspect, the method further includes: connecting to an underlying hardware platform through an intermediate adaptation layer.

According to a second aspect, a database access method is provided. The method is performed in a non-secure execution environment, and includes: sending an encrypted data computation request to a ciphertext operation module, where the encrypted data computation request requests to perform computation on encrypted data of a user, and the ciphertext operation module runs in a trusted execution environment; sending the encrypted data to the ciphertext operation module, where the encrypted data is all encrypted data in a user query request; and receiving an encrypted computation result sent by the ciphertext operation module.

With reference to the second aspect, in some implementations of the second aspect, the sending the encrypted data to the ciphertext operation module includes: sending a data eigenvalue to the ciphertext operation module, where the data eigenvalue indicates the encrypted data; receiving a first feedback, where the first feedback indicates that the ciphertext operation module does not find the data eigenvalue in a cache record; and sending the encrypted data to the ciphertext operation module.

With reference to the second aspect, in some implementations of the second aspect, the sending the encrypted data to the ciphertext operation module further includes: sending a data eigenvalue to the ciphertext operation module, where the data eigenvalue indicates the encrypted data; and receiving a second feedback, where the second feedback indicates that the ciphertext operation module finds the data eigenvalue in a cache record.

According to a third aspect, a database access apparatus is provided. The apparatus is disposed in a trusted execution environment. The apparatus includes: a transceiver module, configured to receive an encrypted data computation request sent by a database kernel, where the encrypted data computation request requests to perform computation on encrypted data of a user, the transceiver module is further configured to receive encrypted data sent by the database kernel, and the encrypted data is all encrypted data in a user query request; and an execution module, configured to perform decryption and computation on the encrypted data in response to the encrypted data computation request, to obtain a computation result, where the execution module is further configured to encrypt the computation result to obtain an encrypted computation result, and the transceiver module is further configured to send the encrypted computation result to the database kernel.

With reference to the third aspect, in some implementations of the third aspect, that the transceiver module receives the encrypted data sent by the database kernel includes: The transceiver module is further configured to receive a data eigenvalue sent by the database kernel, where the data eigenvalue indicates the encrypted data; the transceiver module is further configured to send a first feedback to the database kernel when the execution module does not find the data eigenvalue in a cache record; and the transceiver module is further configured to receive the encrypted data sent by the database kernel in response to the first feedback.

With reference to the third aspect, in some implementations of the third aspect, the execution module is further configured to decrypt the encrypted data to obtain plaintext data; the execution module is further configured to label the plaintext data by using the data eigenvalue, and store the plaintext data; and the execution module is further configured to add the data eigenvalue to the cache record.

With reference to the third aspect, in some implementations of the third aspect, that the transceiver module receives the encrypted data sent by the database kernel further includes: The transceiver module is further configured to receive a data eigenvalue sent by the database kernel, where the data eigenvalue indicates the encrypted data; the transceiver module is further configured to send a second feedback to the database kernel when the execution module finds the data eigenvalue in a cache record; and the transceiver module is further configured to obtain, from stored plaintext data based on the data eigenvalue, plaintext data corresponding to the data eigenvalue, where the plaintext data is data obtained by decrypting the encrypted data.

With reference to the third aspect, in some implementations of the third aspect, the transceiver module is further configured to receive an identity authentication request forwarded by the database kernel, where the identity authentication request is initiated by a database client, and the database client runs in a non-secure execution environment; the transceiver module is further configured to send identity authentication information to the database kernel; and the transceiver module is further configured to receive the encrypted data computation request sent by the database kernel, where the encrypted data computation request is sent after authentication based on the identity authentication information succeeds.

With reference to the third aspect, in some implementations of the third aspect, the transceiver module is further configured to receive a data key of the user that is forwarded by the database kernel, where the data key is encrypted by using an ECDH algorithm; the execution module is further configured to generate a verification key, an encryption/decryption key, and an initial vector value based on the data key; the transceiver module is further configured to receive the encrypted data sent by the database kernel; and the execution module is further configured to check integrity of each piece of data of the encrypted data based on the verification key.

With reference to the third aspect, in some implementations of the third aspect, the encrypted data is data on which an integrity check succeeds.

With reference to the third aspect, in some implementations of the third aspect, that the execution module performs decryption and computation on the encrypted data according to the encrypted data computation request includes: decrypting each piece of data of the encrypted data based on the encryption/decryption key and the initial vector value, to obtain plaintext data corresponding to each piece of data; and calling, according to the encrypted data computation request, an operator to perform computation on the plaintext data corresponding to each piece of data.

With reference to the third aspect, in some implementations of the third aspect, that the execution module encrypts the computation result includes: encrypting the computation result based on the encryption/decryption key and the initial vector value.

With reference to the third aspect, in some implementations of the third aspect, the apparatus further includes a timer, and based on that the timer exceeds first preset time or the transceiver module receives an exit request initiated by the database client and forwarded by the database kernel, the execution module is further configured to clear the encrypted data, the verification key, the encryption/decryption key, and the initial vector value.

With reference to the third aspect, in some implementations of the third aspect, the transceiver module and the execution module are connected to an underlying hardware platform through an intermediate adaptation layer.

Because an intermediate adaptation layer module adapts to programming interfaces provided by different TEEs, functional modules in the TEEs can be seamlessly migrated between different computing platforms, to facilitate secondary development.

According to a fourth aspect, a database access apparatus is provided. The apparatus is disposed in a non-secure execution environment, and includes: a transceiver module, configured to send an encrypted data computation request to a ciphertext operation module, where the encrypted data computation request requests to perform computation on encrypted data of a user, the ciphertext operation module runs in a trusted execution environment, the transceiver module is further configured to send the encrypted data to the ciphertext operation module, the encrypted data is all encrypted data in a user query request, and the transceiver module is further configured to receive an encrypted computation result sent by the ciphertext operation module.

With reference to the fourth aspect, in some implementations of the fourth aspect, the transceiver module sends the encrypted data to the ciphertext operation module, and is configured to: send a data eigenvalue to the ciphertext operation module, where the data eigenvalue indicates the encrypted data; receive a first feedback, where the first feedback indicates that the ciphertext operation module does not find the data eigenvalue in a cache record; and send the encrypted data to the ciphertext operation module.

With reference to the fourth aspect, in some implementations of the fourth aspect, the transceiver module sends the encrypted data to the ciphertext operation module, and is configured to: send a data eigenvalue to the ciphertext operation module, where the data eigenvalue indicates the encrypted data; and receive a second feedback, where the second feedback indicates that the ciphertext operation module finds the data eigenvalue in a cache record.

According to a fifth aspect, a data processing apparatus is provided, including a database kernel deployed in a non-secure execution environment and a data processing module deployed in a trusted execution environment. The data processing module is configured to perform the method according to any one of the implementations of the first aspect and the second aspect.

According to a sixth aspect, a computer-readable storage medium is provided, including instructions. The instructions are used to implement the method according to any one of the implementations of the first aspect and the second aspect.

According to a seventh aspect, a chip is provided. The chip obtains instructions and executes the instructions to implement the database access method according to any one of the implementations of the first aspect and the second aspect.

Optionally, in an implementation, the chip includes a processor and a data interface. The processor reads, through the data interface, instructions stored in a memory, to perform the data access method according to any one of the implementations of the first aspect and the second aspect.

Optionally, in an implementation, the chip may further include a memory. The memory stores instructions. The processor is configured to execute the instructions stored in the memory. When the instructions are executed, the processor is configured to perform the database access method according to any one of the implementations of the first aspect and the second aspect.

BRIEF DESCRIPTION OF DRAWINGS

FIG. 3 is a flowchart of a database access method according to this application;

DESCRIPTION OF EMBODIMENTS

For ease of understanding technical solutions in this application, concepts in this application are first briefly described.

Database kernel: also referred to as a database engine. The database kernel is a set of core functions for performing data operations by a database management system (DBMS). Usually, the database kernel includes five parts: a parser, a planner, an optimizer, an executor, and a storage engine. The parser parses lexis and syntax of structured query language (SQL) entered by a database user to determine a query intention of the user. The planner generates a corresponding execution plan based on a statement parsing result. The optimizer optimizes a preliminarily generated execution plan to efficiently complete an operation requested by the user. The executor executes, based on an optimized execution plan, each operation step in the plan to obtain a result required by the user. The storage engine performs functions such as reading, writing, and indexing in the foregoing process, to provide input and output capabilities for other functional components.

Query request: one or a group of SQL statements entered by a user.

Operator: also referred to as a computation primitive. The operator is the most basic and direct technical operation of a data operation. Examples are comparison operators (>, <, ≥, and ≤), mathematical operators (+, −, and %), and logical relationship operations (and, or, and not).

Remote attestation: Sensitive and confidential data is usually processed in a trusted execution environment (TEE). In an application scenario such as cloud computing, when a user requests a computing service in a TEE on a remote server, it is difficult to know whether the service is running on a real, trusted (authorized) computing platform or in a forged (unauthorized) environment by an attacker. To ensure security of confidential user data and identify a real and trusted TEE environment, a computing or service function in the TEE may use remote attestation to prove validity of the TEE to a remote user through remote attestation by using a certificate chain signed by a key endorsed by a hardware platform (manufacturer).

Session ID: a method for a computer system (usually a server) to identify and track behavior of a single user during any session.

RSA algorithm: one of the most widely used public-key cryptosystems. RSA is abbreviation of first letters of surnames of three proposers.

Key derivation function (HKDF): a basic component of a cryptosystem. The key derivation function is intended to obtain some initial key materials and derive one or more highly secure keys from the materials.

The following describes technical solutions of this application with reference to accompanying drawings.

Figure 1:
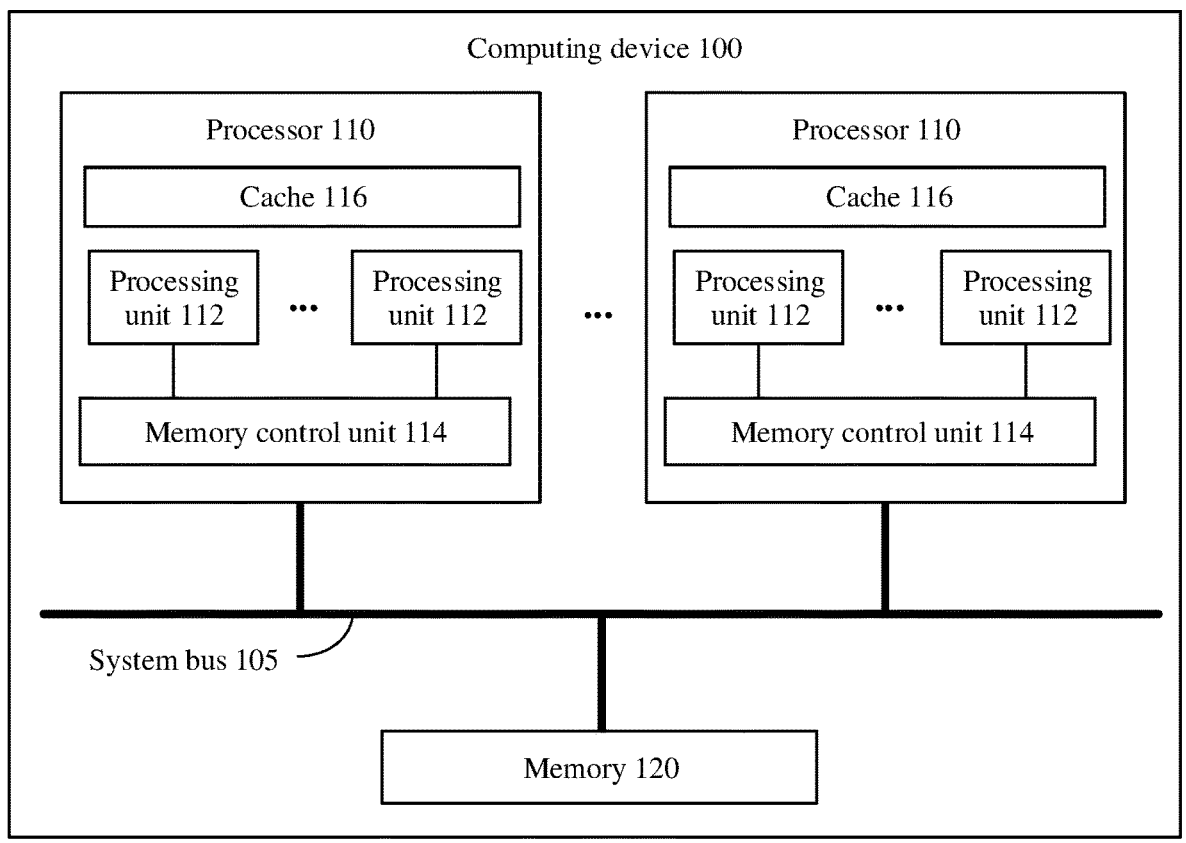
FIG. 1 is a diagram of an architecture of a computing device according to this application.

FIG. 1 is a diagram of an architecture of a computing device 100 according to an embodiment of this application. The computing device 100 may be a server, a computer, or another device with a computing capability. The computing device 100 shown in FIG. 1 includes at least one processor 110 and a memory 120.

The processor 110 executes instructions in the memory 120, so that the computing device 100 implements a database access method provided in this application, for example, implements steps performed by a database access apparatus. Alternatively, the processor 110 executes instructions in the memory 120, so that the computing device 100 implements a database access apparatus provided in this application, for example, implements functional modules included in the database access apparatus.

Optionally, the computing device 100 may further include a system bus 105, and the processor 110 and the memory 120 are separately connected to the system bus 105. The processor 110 can access the memory 120 through the system bus 105. For example, the processor 110 can read and write data or execute code in the memory 120 through the system bus 105. The system bus 105 is a peripheral component interconnect express (PCI) bus, an extended industry standard architecture (EISA) bus, or the like. The system bus 105 is categorized as an address bus, a data bus, a control bus, or the like. For ease of representation, only one bold line is used to represent the system bus 105 in FIG. 1, but this does not mean that there is only one bus or only one type of bus.

In an implementation, a function of the processor 110 is mainly to interpret instructions (or code) of a computer program and process data in computer software. The instructions of the computer program and the data in the computer software may be stored in the memory 120 or a cache 116.

Optionally, the processor 110 may be an integrated circuit chip and has a signal processing capability. As an example rather than a limitation, the processor 110 is a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor is a microprocessor or the like. For example, the processor 110 is a central processing unit (CPU).

Optionally, each processor 110 includes at least one processing unit 112 and a memory control unit 114.

Optionally, the processing unit 112 is also referred to as a core or a kernel, and is the most important component of the processor 110. The processing unit 112 is made of monocrystalline silicon through a production process. All computation, accept commands, storage commands, and data processing of the processor are executed by the core. The processing unit independently runs program instructions, and increases a running speed of a program by using a parallel computing capability. Various processing units have fixed logical structures. For example, the processing unit includes logical units such as a level 1 cache, a level 2 cache, an execution unit, an instruction level unit, and a bus interface.

In an implementation example, the memory control unit 114 is configured to control data exchange between the memory 120 and the processing unit 112. The memory control unit 114 receives a memory access request from the processing unit 112 and controls access to the memory based on the memory access request. As an example rather than a limitation, the memory control unit is a device such as a memory management unit (MMU).

In an implementation example, each memory control unit 114 performs addressing for the memory 120 through the system bus 105. In addition, an arbiter (not shown in the figure) is configured in the system bus 105, and the arbiter processes and coordinates contention-based access of a plurality of processing units 112.

In an implementation example, the processing unit 112 and the memory control unit 114 are communicatively connected through a connection line such as an address line in a chip, to implement communication between the processing unit 112 and the memory control unit 114.

Optionally, each processor 110 further includes a cache 116, and the cache is a data exchange buffer. When the processing unit 112 needs to read data, the processing unit 112 first searches the cache for required data. If the data is found, the processing unit 112 directly reads the data; or if the data is not found, the processing unit 112 searches the memory for the data. Because the cache runs much faster than the memory, a function of the cache is to help the processing unit 112 run faster.

The memory 120 can provide running space for a process on the computing device 100. For example, the memory 120 stores a computer program (program code) for generating the process. After the computer program is run by the processor to generate the process, the processor allocates corresponding storage space to the process in the memory 120. Further, the storage space further includes a text segment, an initial data segment, an uninitialized data segment, a stack segment, a heap segment, and the like. The memory 120 stores, in the storage space corresponding to the process, data generated during running of the process, for example, intermediate data or process data.

Optionally, the memory is also referred to as an internal memory, and is configured to temporarily store operation data in the processor 110 and data exchanged with an external memory such as a hard disk, for example. The processor 110 schedules, to the memory for an operation, data on which the operation needs to be performed, and the processing unit 112 sends a result after the operation is completed.

As an example rather than a limitation, the memory 120 is a volatile memory or a nonvolatile memory, or may include both a volatile memory and/or a nonvolatile memory. The nonvolatile memory can comprise a read-only memory (ROM), a programmable read-only memory (PROM), an erasable programmable read-only memory (EPROM), an electrically erasable programmable read-only memory (EEPROM), or a flash memory. The volatile memory can comprise a random access memory (RAM) and serves as an external cache. By way of example but not limitative description, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), or a Direct Rambus™ random access memory (DR RAM). It should be noted that the memory 120 of the system and the method described in this specification includes but is not limited to these and any memory of another proper type.

The foregoing structure of the computing device 100 is merely an example for description, and this application is not limited thereto. The computing device 100 includes various types of hardware in a computing system in the conventional technology. For example, the computing device 100 further includes a memory other than the memory 120, for example, a magnetic disk memory. A person skilled in the art should understand that the computing device 100 may further include another component required for implementing normal running. In addition, according to a requirement, a person skilled in the art should understand that the computing device 100 may further include a hardware component for implementing another additional function. In addition, a person skilled in the art should understand that the computing device 100 may alternatively include only a component required for implementing embodiments of this application, and does not need to include all the components shown in FIG. 1.

In an open environment, data may be exposed to various attacks. Therefore, processing encrypted data by using a trusted execution environment during running has currently become a hot research topic. The TEE is a security zone in a central processing unit (CPU), runs in an independent environment, and runs in parallel to an operating system. The CPU ensures that confidentiality and integrity of data in the TEE are protected. A trusted application program running in the TEE may access all functions of a main processor and a memory of a device, and hardware isolation protects a TEE-related component from being affected by an application program that is installed by a user and that runs in a main operating system. In short, code and data running in the TEE are confidential and cannot be tampered with.

Currently, a database access method based on a trusted execution environment mainly includes database kernel-level protection, executor-level protection, and/or operator-level protection. Due to a limitation of a current hardware condition, the TEE has many limitations on a size and memory usage of an application running in the TEE, and cannot run large and complex applications. Therefore, functions of a TEE-based database kernel need to be simplified. However, a current database kernel-based isolation solution has disadvantages such as a large code size, a large-sized trusted computing base (TCB), and difficulty with full testing and vulnerability fixing. In comparison, in an executor-based isolation and secure operation solution, functions and code are further simplified. However, because the executor needs to read a data storage file in a non-secure domain, overheads of input and output operations of the executor are still huge, and secure decoupling from a database engine is still a challenge during design implementation. In TEE-based operator-level isolation, only a data operation function is isolated for security, and a code size and a TCB are the smallest. However, during implementation, frequent operations need to be performed on each row of to-be-processed data. This leads to frequent switching between running in a secure domain and running in a non-secure domain, and causes huge performance overheads. In addition, the foregoing three database execution methods are mainly implemented based on an Intel™ SGX (software guard extension) technology, and are tightly coupled to an underlying hardware platform. Therefore, portability of the technical solutions is poor.

Figure 2:
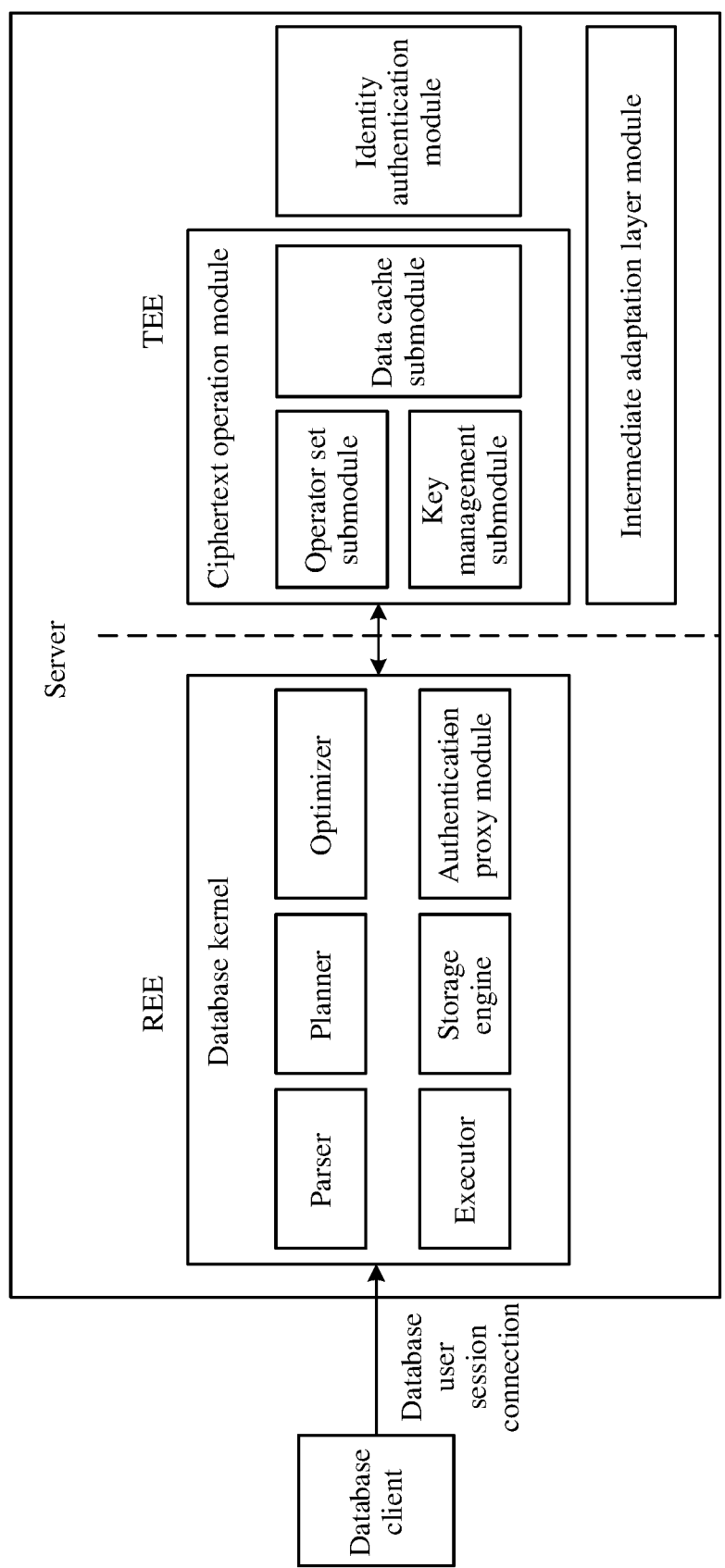
FIG. 2 is a diagram of a system architecture according to this application.

FIG. 2 is a diagram of a system architecture according to an embodiment of this application. As shown in FIG. 2, the system architecture in this embodiment of this application includes a module running in a non-secure execution environment (REE) and a module running in a TEE. The REE is a running environment parallel to the TEE, has its own execution space, and has good openness and scalability, but has many security hazards and is prone to attacks. The following describes the system architecture in this embodiment of this application.

A database kernel runs in the REE. In addition to the parser, the planner, the optimizer, the executor, and the storage engine that are described above, the system architecture in this embodiment of this application further includes an authentication proxy module. The module assists a database client in remote authentication with an identity authentication module in the TEE, and forwards communication data in this process. Because network communication cannot be directly performed in the TEE, a remote authentication request is forwarded by the authentication proxy module in the database kernel of the REE. The authentication proxy module calls a corresponding ecall (enclave call) interface to request certificate information from the identity authentication module in the TEE. The identity authentication module performs an integrity check on request data, and then transmits the certificate information to the identity authentication proxy module. The identity authentication proxy module sends the certificate information to the client for signature verification. The ecall is a programming interface provided for a program in the non-secure execution environment to call a software function in the trusted execution environment. In the system architecture in this embodiment of this application, the database kernel may be deployed on a physical machine (for example, in an operating system of a host machine) or located in a virtual machine (for example, a cloud database). Hardware of the host machine may be any mainstream instruction set architecture (ISA) platform, for example, a computing platform such as Intel™ x86, ARM, or RISC-V.

A ciphertext operation module, the identity authentication module, and an intermediate adaptation layer module run in the TEE.

The ciphertext operation module includes an operator set submodule, a key management submodule, and a data cache submodule. The operator set submodule implements a computation primitive necessary for data computation, where the computation primitive includes a comparison operator, a bit operation, a mode matching operation, mathematical computation, time and date processing, data type conversion, a network address function operation, a text search operation, a set operation, a statistics operation, and the like. The key management submodule is configured to store and manage a user key sent by the database client, derive a data verification key, a data encryption/decryption key, and an initial vector from the user key according to a corresponding algorithm, and clear key information used by a session after the session ends. The data cache submodule calculates a data eigenvalue (HASHSUM) for ciphertext data sent by the executor, decrypts the ciphertext data, and stores corresponding plaintext information if the HASHSUM value is not recorded in a current cache. The data cache submodule manages plaintext data corresponding to the ciphertext data by using a hash table, and establishes an index relationship by using the "HASHSUM value of the ciphertext data" as a key and using the plaintext data corresponding to the ciphertext data as a value, where the HASHSUM value may be calculated by using a public algorithm.

The identity authentication module is configured to receive a database client authentication request forwarded by the authentication proxy module in the REE, to establish a security connection to the database client.

The intermediate adaptation layer module is configured to decouple the ciphertext operation module and the identity authentication module from a specific TEE hardware platform. The intermediate adaptation layer shields different interfaces and capabilities of an underlying hardware platform, provides a unified interface for the ciphertext operation module and the identity authentication module, and converts, based on a parameter of a target hardware platform that is specified in a configuration file, a related call interface into a programming interface provided by the target hardware platform, to achieve cross-platform portability of the entire system. The hardware platform may be Intel™ SGX, AIVID™ SEV, ARM TrustZone™, RISC-V Keystone, or the like.

FIG. 3 is a flowchart of a database access method according to an embodiment of this application. As shown in FIG. 3, the method includes step 301 to step 305. The database access method in FIG. 3 is performed in a trusted execution environment TEE, and may be performed by the computing device shown in FIG. 1. The following provides descriptions.

S301: Receive an encrypted data computation request sent by a database kernel, where the encrypted data computation request requests to perform computation on encrypted data of a user, and the database kernel runs in a non-secure execution environment.

The user sends a query request to a database client, where the query request may include an SQL statement entered by the user, a column name of the encrypted data, an operation for the encrypted data, a related operation parameter, and the like. The database client runs in a non-secure execution environment. The database client encrypts some data in the query request that involves confidentiality of the user to obtain the encrypted data. Then the database client sends the query request (including unencrypted data and the encrypted data) to the database kernel. After the database kernel receives the query request, a parser in the database kernel parses the query request, a planner generates a corresponding execution plan based on a parsing result, an optimizer optimizes the execution plan, and an executor performs execution according to an optimized execution plan. However, for the encrypted data, because the database kernel running in the REE cannot directly perform an operation on the encrypted data, the database kernel needs to send an encrypted data computation request to a TEE to perform computation on the encrypted data in the TEE.

That the database client runs in a non-secure execution environment herein means that the database client may be in a local REE (a computer on which the database kernel runs), or may be in an REE on another computer. In this case, the database client may directly communicate with the database kernel through a network. It should be understood that, in this application, this description is applicable to any case in which a database client runs in a non-secure execution environment.

S302: Receive encrypted data sent by the database kernel, where the encrypted data is all encrypted data in a user query request.

Because computation for the encrypted data needs to be performed in the TEE, all the encrypted data needs to be sent to the TEE. In the database access method in this embodiment of this application, a manner of sending the encrypted data to the TEE may comprise sending all the encrypted data to the TEE at a time, or may comprise sending all the encrypted data to the TEE in a plurality of times until all the encrypted data is sent. Then, during computation for the encrypted data, a module in the TEE no longer requests any data from the REE. This avoids frequent switching between the REE and the TEE, avoids leakage of a data access mode during computation, and ensures data security.

S303: Perform decryption and computation on all the encrypted data in response to the encrypted data computation request, to obtain a computation result.

After all the encrypted data is received, all the encrypted data is decrypted to obtain corresponding plaintext data. Then corresponding computation is performed on the plaintext data according to the encrypted data computation request to obtain a corresponding computation result.

S304: Encrypt the computation result to obtain an encrypted computation result.

S305: Send the encrypted computation result to the database kernel.

To ensure data security, after the computation result is obtained, the computation result is encrypted in the TEE, and then the encrypted computation result is sent to the database kernel. After receiving the encrypted computation result, the database kernel performs necessary processing and caching on the encrypted computation result, and then ends the current computation process. Finally, the database kernel sends a processed computation result to the database client.

Optionally, before all the encrypted data sent by the database kernel is received in S302, the database access method in this embodiment of this application further includes the following steps: A data eigenvalue sent by the database kernel is received, where the data eigenvalue indicates the encrypted data, is calculated by the database kernel based on all the encrypted data, and corresponds to all the encrypted data. Then a cache record is searched based on the data eigenvalue, where a plurality of data eigenvalues are recorded in the cache record. If the data eigenvalue can be found, it indicates that encrypted data corresponding to the data eigenvalue has been cached in the TEE. If the data eigenvalue is not found in the cache record, a first feedback is sent to the database kernel, where the first feedback indicates that the data eigenvalue is not found in the cache record. After receiving the first feedback, the database kernel sends, to the TEE, all the encrypted data corresponding to the data eigenvalue.

Optionally, after all encrypted data sent by the database kernel is received, the database access method in this embodiment of this application further includes: decrypting all the encrypted data to obtain corresponding plaintext data, labeling the plaintext data by using the data eigenvalue, storing the plaintext data, and adding the data eigenvalue to the cache record. In this way, within a period of time when the database kernel re-requests computation related to the encrypted data, corresponding computation may be directly performed based on the stored plaintext data, the database kernel does not need to be requested to send the encrypted data again, and the encrypted data does not need to be decrypted again, so that overhead is reduced.

Optionally, when the data eigenvalue sent by the database kernel is received, if the data eigenvalue is found in a cache record, a second feedback is sent to the database kernel. The second feedback indicates that the data eigenvalue is found in the cache record. Therefore, the encrypted data does not need to be requested from the database kernel, and the stored corresponding plaintext data is directly obtained from the TEE based on the data eigenvalue. Then corresponding computation is performed on the plaintext data according to the encrypted data computation request.

To ensure security of data transmission, before the encrypted data computation request sent by the database kernel is received, the database access method in this embodiment of this application further includes: verifying validity of the TEE. The database client initiates identity authentication. Because network communication cannot be directly performed in the TEE, the database client sends an identity authentication request to the database kernel, and then the database kernel forwards the identity authentication request to the TEE. After receiving the identity authentication request, a related identity authentication module in the TEE sends certificate information to the database kernel, and then the database kernel forwards the certificate information to the database client. After the database client verifies a certificate of the TEE, the database client establishes a security connection to the database kernel. In this case, the received encrypted data computation request sent by the database kernel is sent after identity authentication succeeds.

After the database client establishes the security connection to the database kernel, the database client sends a data key of the user to the database kernel. To ensure security of the data key of the user during transmission, the data key is encrypted by using an elliptic curve Diffie-Hellman key exchange (ECDH) encryption parameter determined through negotiation between the database client and the related identity authentication module in the TEE. The database kernel forwards the data key to a related key management module in the TEE. The key management module generates, based on the data key, a verification key, an encryption/decryption key, and an initial vector value for data verification and encryption/decryption in subsequent data transmission. An algorithm for generating the keys may be a key derivation algorithm such as an HKDF. Functions of the generated verification key, encryption/decryption key, and initial vector value include: in S302, after all the encrypted data sent by the database kernel is received, integrity of each piece of data of all the encrypted data is checked based on the verification key. In S303, the performing decryption and computation on all the encrypted data according to the encrypted data computation request includes: decrypting each piece of data of all the encrypted data based on the encryption/decryption key and the initial vector value, and then calling an operator according to the encrypted data computation request to perform computation on each piece of data of all the encrypted data. In S304, the encrypting the computation result comprises encrypting the computation result based on the encryption/decryption key and the initial vector value.

Optionally, the database access method in this embodiment of this application further includes: setting a timer for current database access; and clearing all the encrypted data, the verification key, the encryption/decryption key, and the initial vector value when the timer exceeds first preset time or an exit request initiated by the database client and forwarded by the database kernel is received.

Optionally, the database access method in this embodiment of this application further includes: connecting to an underlying hardware platform through an intermediate adaptation layer. The intermediate adaptation layer decouples other functional modules in the TEE from the underlying hardware platform. These functional modules are not directly developed based on a programming interface provided by a specific hardware platform (for example, Intel™ SGX or ARM TrustZone™). Because the intermediate adaptation layer adapts to programming interfaces provided by different TEEs, a functional module developed based on a specific hardware platform can be seamlessly migrated between different computing platforms. This simplifies secondary development.

In the database access method in FIG. 3, all the encrypted data is sent to a module in the TEE, to avoid frequent switching between the TEE and the REE during data requesting and data transmission, and reduce performance overheads. All the encrypted data is sent to the module in the TEE before computation is performed on the encrypted data. In this way, data in the REE does not need to be requested again during computation for the encrypted data. This avoids leakage of an access mode for data on the REE side during execution and improves security. In addition, the encrypted data is decrypted and then cached in the TEE. Therefore, when computation related to the encrypted data needs to be performed again within a period of time, the encrypted data does not need to be transmitted or decrypted again. This further reduces performance overhead.

Figure 4:
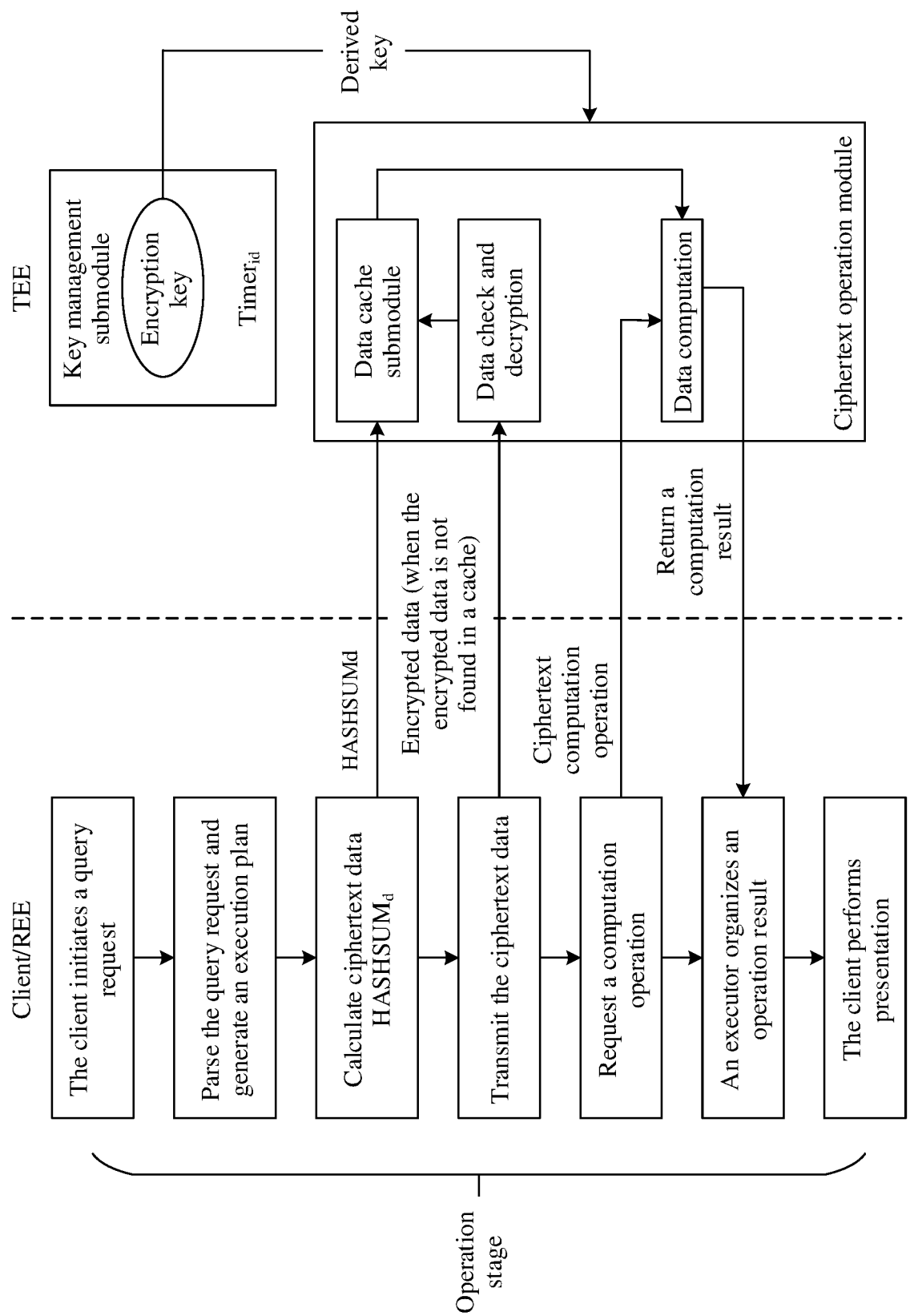
FIG. 4 is a flow diagram of a database access method according to this application.

FIG. 4 is a flow diagram of a database access method according to this application. The following provides detailed descriptions.

1. In a session $ID_s$, a user initiates a query request related to encrypted data to a database server by using a database client. The query request includes an SQL statement entered by the user, a column name of the encrypted data, an operation for the encrypted data, a related operation parameter, and the like. Data entered by the user is plaintext, and the client encrypts, by using a data encryption key, data (for example, an operation parameter) that is in the plaintext and that needs to be encrypted, and then sends the query request to a database kernel.

2. The database kernel parses the query request, generates an execution plan, and executes the plan. A parser in the database kernel parses information, such as an operation, a table/view, and the column name of the encrypted data, that is related to the query request, a planner generates the execution plan, and an optimizer optimizes the execution plan and sends an optimized execution plan to an executor.

3. For an operation related to the encrypted data, the executor obtains, through a storage engine, all encrypted data included in the operation, and calculates a data eigenvalue $HASHSUM_d$. Then the executor calls an ecall interface to transmit a current timestamp $T_{cur}$ and the $HASHSUM_d$ to a data cache submodule in a TEE.

4. The data cache submodule queries a data cache record. If plaintext corresponding to the $HASHSUM_d$ exists, the data cache submodule returns True to the database kernel. If no plaintext corresponding to the $HASHSUM_d$ exists, the data cache submodule returns False to the database kernel. When the database kernel receives False, the executor in the database kernel calls the ecall interface to transmit all the encrypted data to a ciphertext operation module. The data cache submodule checks integrity of each piece of data by using a data verification key $Key_m$ of the user in the session $ID_s$, and then decrypts each piece of data by using an encryption/decryption key $Key_e$ and an initial vector value $IV_e$. Finally, the data cache submodule clears ciphertext data, labels the plaintext data by using the $HASHSUM_d$, and updates a data cache corresponding to the session $ID_s$. Correspondingly, when receiving True, the database kernel does not perform corresponding encrypted data transmission, decryption, or caching. For obtaining of the data verification key $Key_m$, the encryption/decryption key $Key_e$, and the initial vector value $IV_e$, refer to the following descriptions of FIG. 4.

5. The executor calls the ecall interface to send a requested ciphertext computation operation to the ciphertext operation module in the TEE. The ciphertext operation module obtains, through the data cache submodule in the TEE, the plaintext data corresponding to the $HASHSUM_d$, and then calls a corresponding operator to perform requested computation on the plaintext data piece by piece.

6. After the computation is completed, the ciphertext operation module in the TEE encrypts a computation result by using the $Key_e$ and the $IV_e$; then calls the ecall interface to return an encrypted computation result to the database kernel, or calls an ocall (out call) interface to transmit the computation result to the executor; and finally resets a timer $Timer_{id}$ of the session $ID_s$. The ocall interface is a programming interface provided for a program in the trusted execution environment to call a software function in a non-secure execution environment. For obtaining of the data verification key $Key_m$, the encryption/decryption key $Key_e$, and the initial vector value $IV_e$, refer to the following descriptions of FIG. 4.

7. After receiving the encrypted computation result sent by the ciphertext operation module, the executor performs necessary processing and caching, and then ends a current round of computation. Correspondingly, for other ciphertext operations, the foregoing step 3 to step 5 are repeated.

8. The executor returns a final encrypted computation result to the client, and the client decrypts an encrypted operation result and organizes presentation.

Figure 5:
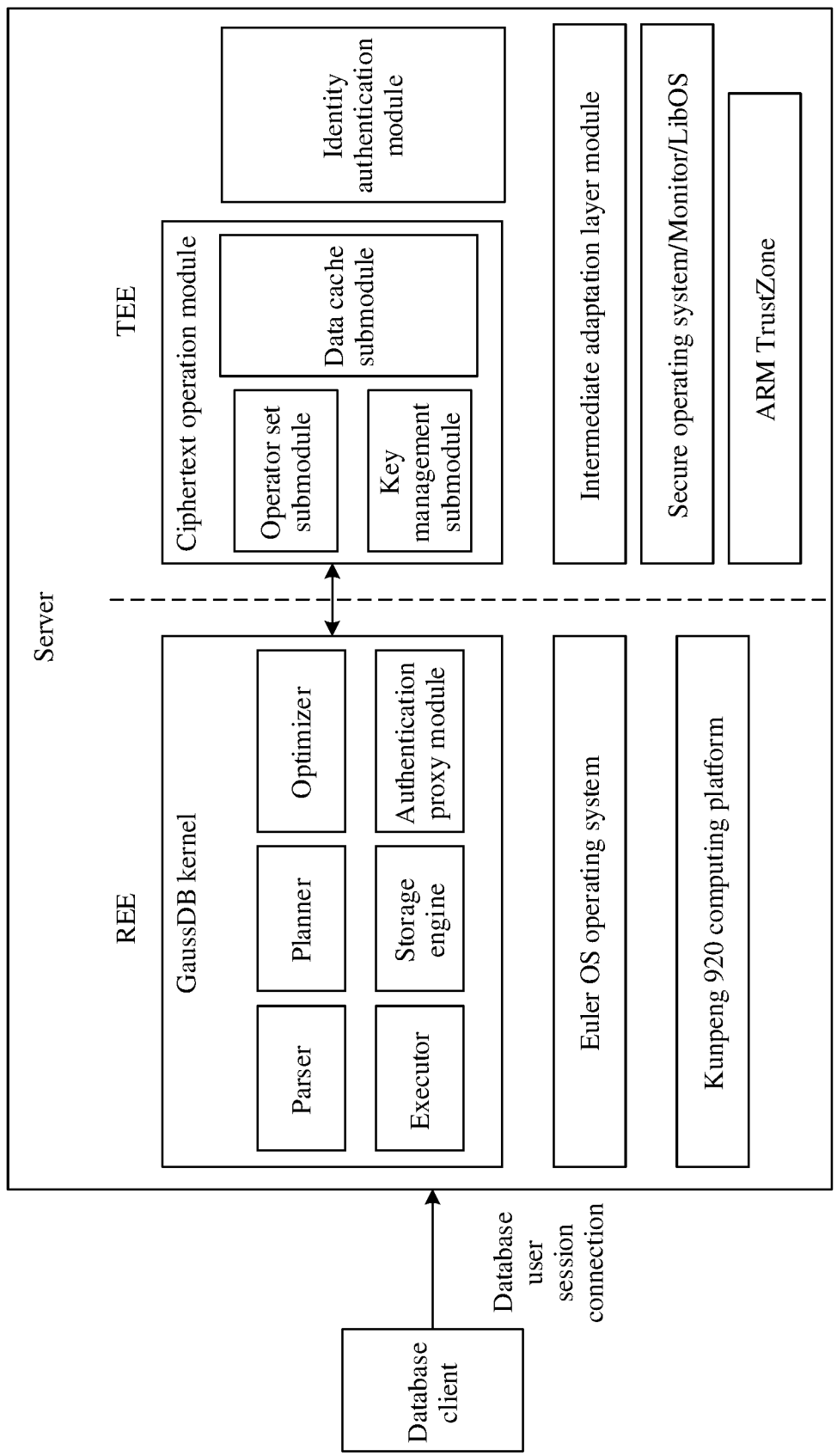
FIG. 5 is a diagram of an architecture of an application of a database access method according to this application.

FIG. 5 is a diagram of an architecture of an application of a database access method according to an embodiment of this application. As shown in FIG. 5, a database in the database access method in this application may be GaussDB™, and a cryptographic database solution based on operator-level isolation is implemented based on a Kunpeng 920 computing platform. Kunpeng 920 is a processor implemented based on an ARM aarch64 architecture design, and provides a TEE environment based on an ARM TrustZone™ technology. A GaussDB™ kernel runs in an EulerOS™ operating system, and a ciphertext operation module, an identity authentication module, and an intermediate adaptation layer module are all located in an ARM TrustZone™ environment.

To securely and correctly perform querying and computation on confidential data of a user, when necessary, an executor of the database kernel needs to send the confidential data of the user to the ciphertext operation module running in the TEE, and a client also needs to send a stored data key of the user to the TEE for data encryption/decryption. For security, validity of the TEE needs to be verified before the foregoing sensitive information is transmitted to prevent an unauthorized program or an attacker from stealing user data by forging the TEE. Therefore, in the database access method in this embodiment of this application, the client can authenticate the TEE through the identity authentication module.

Figure 6:
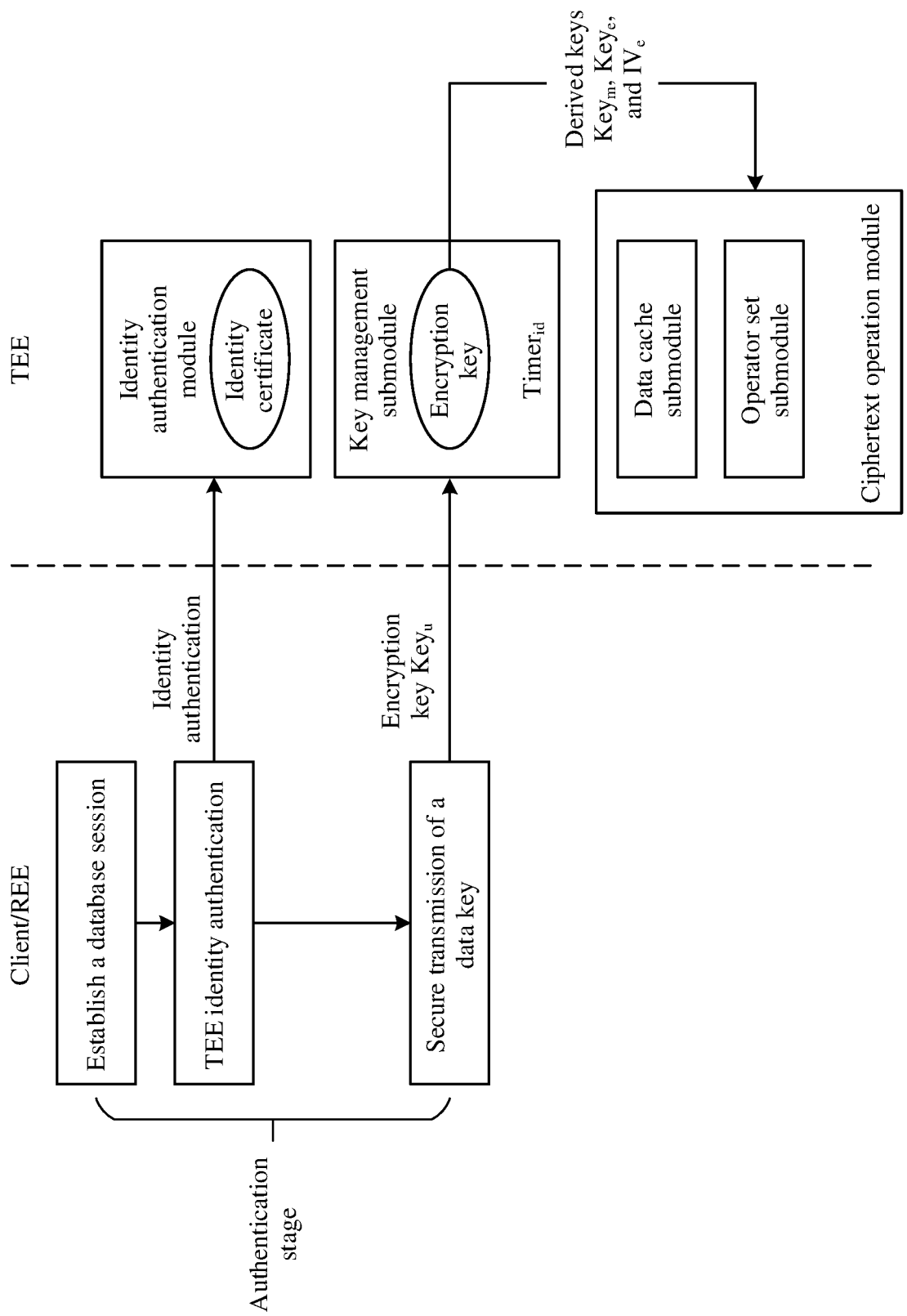
FIG. 6 is a diagram of an identity authentication process in a database access method according to this application.

FIG. 6 is a diagram of an identity authentication process in a database access method according to an embodiment of this application. The following describes the identity authentication process in the database access method in this embodiment of this application with reference to FIG. 6.

1. Remote authentication is performed between a database client and an identity authentication module running in a TEE. The database client actively initiates an identity authentication request for the TEE. Because a module running in the TEE cannot directly perform network communication, the identity authentication request is forwarded by an authentication proxy module in a database kernel in an REE (as shown in FIG. 5). The authentication proxy module calls a corresponding ecall interface to request certificate information from the identity authentication module in the TEE. The identity authentication module performs integrity check on request data, and then transmits the certificate information to the identity authentication proxy module. The identity authentication proxy module forwards the certificate information to the client for signature verification. After signature verification on an identity certificate succeeds, the client establishes a secure socket layer (SSL) connection to the database kernel.

2. The database client and the identity authentication module in the TEE negotiate an encryption parameter based on an elliptic curve Diffie-Hellman key exchange (ECDH) mechanism, and a user key $Key_u$ is encrypted based on an ECDH encryption parameter determined through negotiation. An ECDH encryption parameter negotiation request is also forwarded by the authentication proxy module by calling a corresponding ecall interface. To ensure security of the ECDH encryption parameter during transmission, the identity authentication module and the client may encrypt the ECDH encryption parameter by using an RSA algorithm or the like before exchanging the ECDH encryption parameter. After the negotiation is completed, the client transmits, to the authentication proxy module, a user $ID_s$ and a data key $Key_u$ encrypted by using the ECDH parameter determined through negotiation. The authentication proxy module calls a corresponding ecall interface to transmit the data to a key management submodule in the TEE.

3. The key management submodule in the TEE decrypts the encrypted data key Keyµ by using the ECDH parameter determined through negotiation, derives a data verification key $Key_m$, an encryption/decryption key $Key_e$, and an initial vector value IV e according to the data key $Key_u$ and an algorithm (for example, an HKDF), records a correspondence between the user $ID_s$ and the $Key_m$, $Key_e$, and $IV_e$, and clears the $Key_u$. Finally, the key management submodule sets a timer $Timer_{id}$ for the $ID_s$, and time of the timer may be preconfigured by a database administrator in a unified manner. It should be noted that a key derivation method in this application may be any conventional key derivation method. This is not limited in this application.

After the foregoing identity authentication steps are completed, the key management submodule running in the TEE has obtained check and encryption/decryption keys for user data. In this case, the user may initiate a ciphertext query request to the database kernel through the client. A statement of the ciphertext query request includes an encrypted ciphertext operation parameter and a plaintext query statement. The database kernel in the non-secure execution environment parses the statement, generates a query plan, and optimizes the query plan. Finally, an executor in the database kernel performs an operation in the query plan. For an operation related to encrypted data, the executor obtains all the encrypted data at a time through a storage engine and sends the encrypted data, an encrypted operation parameter, and a computation type to a ciphertext operation module in the TEE. For a process of performing querying and computation on the encrypted data, refer to the foregoing descriptions of FIG. 4. For brevity, details are not described herein again in this embodiment of this application.

Figure 7:
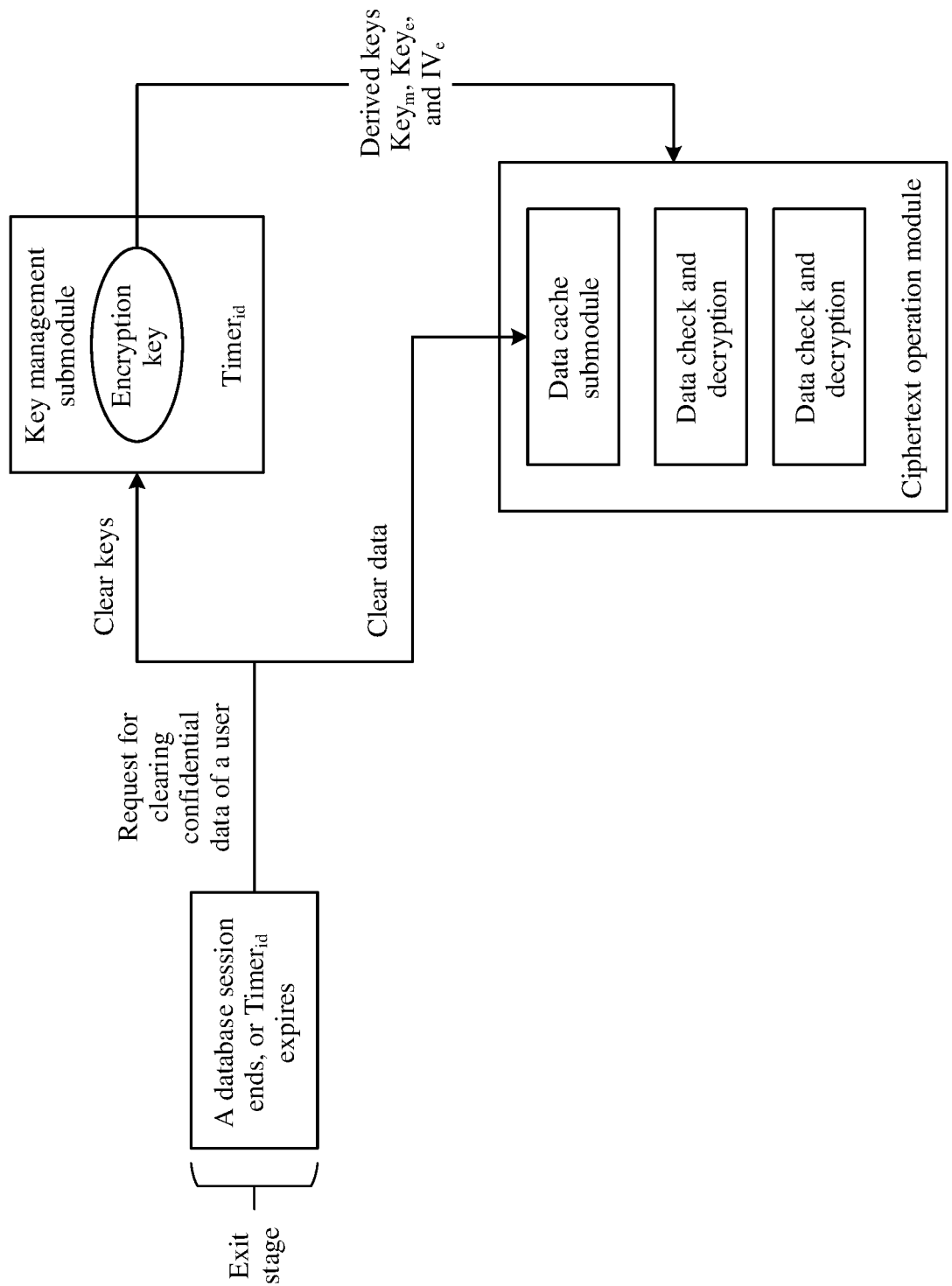
FIG. 7 is a diagram of an exit process in a database access method according to this application.

When the user obtains a related ciphertext data query result and determines to actively exit, the database access method in this embodiment of this application further includes: The user disables a ciphertext query function or exits a database connection, and the client actively initiates an exit-stage operation to the database kernel. FIG. 7 is a diagram of an exit stage in the database access method in this application. As shown in FIG. 7, if the user actively exits, the client sends an exit request and the user $ID_s$ to the authentication proxy module in the database kernel. The authentication proxy module forwards the exit request and the user $ID_s$ to the ciphertext operation module in the TEE. The ciphertext operation module clears the currently used keys $Key_m$, $Key_e$, and $IV_e$, and cached plaintext data. Optionally, if the timer $Timer_{id}$ in the TEE expires, the ciphertext operation module may alternatively actively clear the currently used keys $Key_m$, $Key_e$, and $IV_e$, and the cached plaintext data.

Compared with a conventional database access method, in the database access method in this embodiment of this application, all ciphertext data is sent to the ciphertext operation module in the TEE before computation, and the ciphertext operation module decrypts all the ciphertext data so that overheads of switching between the TEE and the REE can be significantly reduced. For example, it is assumed that a to-be-queried data table has 10000 rows of records, and each row of record includes 128-byte ciphertext data. Therefore, it can be learned through calculation that switching needs to be performed between the TEE and the REE 20000 times in the conventional database access method. For each piece of data, a computation function of the TEE needs to be called from the REE, and then switching is performed back to the REE after a computation result is obtained. Therefore, switching needs to be performed twice for computation of each piece of data. It is assumed that an upper limit of single data transmission between the REE and the TEE is 128 KB. In the database access method in this embodiment of this application, a quantity of times of calling the TEE from the REE is as follows: 128×10000/(128 K)=10. Switching is performed back to the REE after a computation result is obtained, and switching is performed 20 times in total. This significantly reduces switching overheads compared with 20000 times in the conventional technology.

In addition, in the database access method in this embodiment of this application, the ciphertext data is decrypted and then cached, so that data decryption overheads can be significantly reduced. For example, in the conventional database access method, time consumed for decrypting 128-byte data each time is m. Therefore, duration of 10000 m is needed for each time of decryption. If same data is subsequently processed again, same decryption duration is further needed. However, in the database access method in this embodiment of this application, duration of 10000 m needs to be consumed only during $1^{st}$ decryption, and decryption does not need to be performed again if same data is subsequently processed again.

Figure 8:
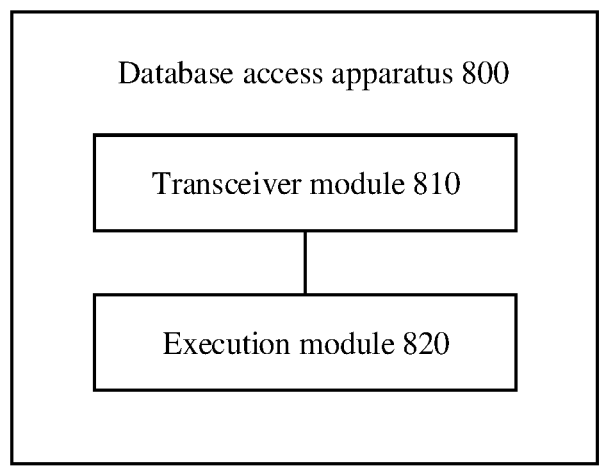
FIG. 8 is a diagram of a database access apparatus according to this application.

FIG. 8 is a diagram of a database access apparatus 800 according to an embodiment of this application. The database access apparatus 800 can perform the steps of the database access methods in FIG. 3, FIG. 4, FIG. 6, and FIG. 7. To avoid repetition, details are not described herein again. The database access apparatus 800 includes a transceiver module 810 and an execution module 820. The following provides brief descriptions.

The transceiver module 810 is configured to receive an encrypted data computation request sent by a database kernel. The encrypted data computation request requests to perform computation on encrypted data of a user. The database kernel runs in a non-secure execution environment.

The transceiver module 810 is further configured to receive encrypted data sent by the database kernel. The encrypted data is all encrypted data in a user query request.

The execution module 820 is configured to perform decryption and computation on the encrypted data in response to the encrypted data computation request to obtain a computation result.

The execution module 820 is further configured to encrypt the computation result to obtain an encrypted computation result.

The transceiver module 810 is further configured to send the encrypted computation result to the database kernel.

Optionally, that the transceiver module 810 receives the encrypted data sent by the database kernel includes: the transceiver module 810 is further configured to receive a data eigenvalue sent by the database kernel. The data eigenvalue indicates the encrypted data. The transceiver module is further configured to send a first feedback to the database kernel when the execution module does not find the data eigenvalue in a cache record. The transceiver module is further configured to receive the encrypted data sent by the database kernel in response to the first feedback.

Optionally, the execution module 820 is further configured to decrypt the encrypted data to obtain plaintext data; the execution module 820 is further configured to label the plaintext data by using the data eigenvalue, and store the plaintext data; and the execution module 820 is further configured to add the data eigenvalue to the cache record.

Optionally, that the transceiver module 810 receives the encrypted data sent by the database kernel further includes: The transceiver module 810 is further configured to receive a data eigenvalue sent by the database kernel, where the data eigenvalue indicates the encrypted data; the transceiver module 810 is further configured to send a second feedback to the database kernel when the execution module finds the data eigenvalue in a cache record; and the transceiver module 810 is further configured to obtain, from stored plaintext data based on the data eigenvalue, plaintext data corresponding to the data eigenvalue, where the plaintext data is data obtained by decrypting the encrypted data.

Optionally, the transceiver module 810 is further configured to receive an identity authentication request forwarded by the database kernel, where the identity authentication request is initiated by a database client, and the database client runs in a non-secure execution environment; the transceiver module 810 is further configured to send identity authentication information to the database kernel; and the transceiver module 810 is further configured to receive the encrypted data computation request sent by the database kernel, where the encrypted data computation request is sent after authentication based on the identity authentication information succeeds.

Optionally, the transceiver module 810 is further configured to receive a data key of the user that is forwarded by the database kernel, where the data key is encrypted by using an ECDH algorithm; the execution module 820 is further configured to generate a verification key, an encryption/decryption key, and an initial vector value based on the data key; the transceiver module is further configured to receive the encrypted data sent by the database kernel; and the execution module is further configured to check integrity of each piece of data of the encrypted data based on the verification key.

Optionally, after the transceiver module 810 receives the encrypted data sent by the database kernel, the encrypted data is data on which an integrity check succeeds.

Optionally, that the execution module 820 performs decryption and computation on the encrypted data according to the encrypted data computation request includes: decrypting each piece of data of the encrypted data based on the encryption/decryption key and the initial vector value; and calling, according to the encrypted data computation request, an operator to perform computation on each piece of data of the encrypted data.

Optionally, that the execution module 820 encrypts the computation result includes: encrypting the computation result based on the encryption/decryption key and the initial vector value.

Optionally, the apparatus further includes a timer, and based on that the timer exceeds first preset time or the transceiver module 810 receives an exit request initiated by the database client and forwarded by the database kernel, the execution module 820 is further configured to clear the encrypted data, the verification key, the encryption/decryption key, and the initial vector value.

Optionally, the transceiver module 810 and the execution module 820 in the apparatus are connected to an underlying hardware platform through an intermediate adaptation layer.

An embodiment of this application further provides a data processing apparatus. The data processing apparatus may be a hardware apparatus such as a server, or may be a software apparatus. The data processing apparatus includes a database kernel deployed in a non-secure execution environment and a data processing module deployed in a trusted execution environment. The data processing module is configured to perform the methods shown in FIG. 3, FIG. 4, FIG. 6, and FIG. 7.

An embodiment of this application further provides a computer-readable storage medium, including instructions. The instructions are used to implement the methods in FIG. 3, FIG. 4, FIG. 6, and FIG. 7.

A person of ordinary skill in the art may be aware that, in combination with examples described in embodiments disclosed in this specification, units and algorithm steps can be implemented by electronic hardware or a combination of computer software and electronic hardware. Whether the functions are performed by hardware or software depends on particular applications and design constraints of technical solutions. A person skilled in the art may use different methods to implement the described functions for each particular application, but it should not be considered that the implementation goes beyond the scope of this application.

It can be clearly understood by a person skilled in the art that, for ease and brevity of description, for a detailed operating process of the foregoing system, apparatus, and unit, reference may be made to a corresponding process in the foregoing method embodiments, and details are not described herein again.

In several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts shown as units may or may not be physical units, that is, may be located in one place, or may be distributed on a plurality of network units. Some or all of the units may be selected according to actual requirements to achieve objectives of solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, technical solutions of this application essentially, or a part contributing to the conventional technology, or some of technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The storage medium includes any medium that can store program code, for example, a USB flash drive, a removable hard disk, a read-only memory (ROM), a random access memory (RAM), a magnetic disk, or an optical disc.

The foregoing descriptions are merely implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A database access method, the method being performed in a trusted execution environment (TEE), the method comprising:
receiving an encrypted data computation request sent by a database kernel, the encrypted data computation request requesting to perform computation on encrypted data of a user, the database kernel running in a non-secure execution environment (REE);
receiving encrypted data sent by the database kernel, the encrypted data comprising all encrypted data in a user query request;
performing decryption and computation on the encrypted data in response to the encrypted data computation request to obtain a computation result;
encrypting the computation result to obtain an encrypted computation result; and
sending the encrypted computation result to the database kernel.

2. The method according to claim 1, wherein the receiving the encrypted data sent by the database kernel comprises:
receiving a data eigenvalue sent by the database kernel, the data eigenvalue indicating the encrypted data;
sending a first feedback to the database kernel when the data eigenvalue is not found in a cache record; and
receiving the encrypted data sent by the database kernel in response to the first feedback.

3. The method according to claim 2, wherein the method further comprises:
decrypting the encrypted data to obtain plaintext data;
labeling the plaintext data using the data eigenvalue and storing the plaintext data; and
adding the data eigenvalue to the cache record.

4. The method according to claim 1, wherein the receiving the encrypted data sent by the database kernel comprises:
receiving a data eigenvalue sent by the database kernel, the data eigenvalue indicating the encrypted data;
sending a second feedback to the database kernel when the data eigenvalue is found in a cache record; and
obtaining, from stored plaintext data based on the data eigenvalue, plaintext data corresponding to the data eigenvalue, the plaintext data being obtained by decrypting the encrypted data.

5. The method according to claim 1, wherein the method further comprises:
receiving an identity authentication request forwarded by the database kernel, wherein the identity authentication request is initiated by a database client and the database client runs in the non-secure execution environment (REE);
sending identity authentication information to the database kernel; and
receiving the encrypted data computation request sent by the database kernel, wherein the encrypted data computation request is sent after authentication based on the identity authentication information has succeeded.

6. The method according to claim 5, wherein the method further comprises:
receiving a data key of the user that is forwarded by the database kernel, wherein the data key is encrypted according to an ECDH algorithm;
generating a verification key, an encryption/decryption key, and an initial vector value based on the data key;
receiving the encrypted data sent by the database kernel; and
checking integrity of each piece of data of the encrypted data based on the verification key.

7. The method according to claim 6, wherein the encrypted data is data on which an integrity check succeeds.

8. The method according to claim 6, wherein the performing the decryption and the computation on the encrypted data in response to the encrypted data computation request comprises:
decrypting each piece of data of the encrypted data based on the encryption/decryption key and the initial vector value to obtain plaintext data corresponding to each piece of data; and
calling, based on the encrypted data computation request, one or more operators to perform computation on the plaintext data corresponding to each piece of data.

9. The method according to claim 6, wherein the encrypting the computation result comprises:
encrypting the computation result based on the encryption/decryption key and the initial vector value.

10. The method according to claim 6, wherein the method further comprises:
setting a timer; and
clearing the encrypted data, the verification key, the encryption/decryption key, and the initial vector value based on the timer exceeding a first preset time or based on an exit request having been received, wherein the exit request was initiated by the database client and forwarded by the database kernel.

11. The method according to claim 1, wherein the method further comprises:
connecting to an underlying hardware platform through an intermediate adaptation layer.

12. A database access apparatus, the database access apparatus is disposed in a trusted execution environment, the database access apparatus comprising:
a transceiver configured to:
receive an encrypted data computation request sent by a database kernel, the encrypted data computation request requesting to perform computation on encrypted data of a user, the database kernel running in a non-secure execution environment (REE); and
receive encrypted data sent by the database kernel, the encrypted data comprising all encrypted data in a user query request;
at least one processor in communication with the transceiver, the at least one processor configured to:
perform decryption and computation on the encrypted data in response to the encrypted data computation request to obtain a computation result; and
encrypt the computation result to obtain an encrypted computation result; and
the transceiver is further configured to send the encrypted computation result to the database kernel.

13. The database access apparatus according to claim 12, wherein the transceiver receiving the encrypted data sent by the database kernel comprises:
receive a data eigenvalue sent by the database kernel, the data eigenvalue indicating the encrypted data;
send a first feedback to the database kernel when the data eigenvalue is not found in a cache record; and
receive the encrypted data sent by the database kernel in response to the first feedback.

14. The database access apparatus according to claim 13, wherein the at least one processor is further configured to:
decrypt the encrypted data to obtain plaintext data;
label the plaintext data using the data eigenvalue and store the plaintext data; and
add the data eigenvalue to the cache record.

15. The database access apparatus according to claim 12, wherein the transceiver receiving the encrypted data sent by the database kernel comprises:
- receive a data eigenvalue sent by the database kernel, the data eigenvalue indicating the encrypted data;
- send a second feedback to the database kernel when the data eigenvalue is found in a cache record; and
- obtain, from stored plaintext data based on the data eigenvalue, plaintext data corresponding to the data eigenvalue, the plaintext data being obtained by decrypting the encrypted data.

16. The database access apparatus according to claim 12, wherein the transceiver is further configured to:
- receive an identity authentication request forwarded by the database kernel, wherein the identity authentication request is initiated by a database client, and the database client runs in the non-secure execution environment (REE);
- send identity authentication information to the database kernel; and
- receive the encrypted data computation request sent by the database kernel, wherein the encrypted data computation request is sent after authentication based on the identity authentication information has succeeded.

17. A data processing apparatus comprising:
- a memory storing instructions;
- at least one processor in communication with the memory, the at least one processor configured, upon execution of the instructions, to perform:
  - receive an encrypted data computation request in a trusted execution environment (TEE), the encrypted data computation request being sent by the database kernel to the TEE, the encrypted data computation request requesting the TEE perform computation on encrypted data of a user, the database kernel running in a non-secure execution environment (REE);
  - receive, in the TEE, encrypted data sent by the database kernel, the encrypted data comprising the encrypted data in the encrypted data computation request;
  - perform decryption and computation on the encrypted data in response to the encrypted data computation request to obtain a computation result;
  - encrypt the computation result to obtain an encrypted computation result; and
  - send the encrypted computation result to the database kernel.

18. The data processing apparatus according to claim 17, wherein the receiving the encrypted data sent by the database kernel comprises:
- receiving a data eigenvalue sent by the database kernel, the data eigenvalue indicating the encrypted data;
- sending a first feedback to the database kernel when the data eigenvalue is not found in a cache record; and
- receiving the encrypted data sent by the database kernel in response to the first feedback.

19. A non-transitory computer-readable media storing computer instructions, that configure at least one processor, upon execution of the instructions, to perform the following steps:
- receiving an encrypted data computation request sent by a database kernel, the encrypted data computation request requesting to perform computation on encrypted data of a user, the database kernel running in a non-secure execution environment (REE);
- receiving encrypted data sent by the database kernel, the encrypted data comprising all encrypted data in a user query request;
- performing decryption and computation on the encrypted data in response to the encrypted data computation request to obtain a computation result;
- encrypting the computation result to obtain an encrypted computation result; and
- sending the encrypted computation result to the database kernel.

20. The computer-readable media according to claim 19, wherein the receiving the encrypted data sent by the database kernel comprises:
- receiving a data eigenvalue sent by the database kernel, the data eigenvalue indicating the encrypted data;
- sending a first feedback to the database kernel when the data eigenvalue is not found in a cache record; and
- receiving the encrypted data sent by the database kernel in response to the first feedback.

* * * * *